United States Patent [19]

Yokota et al.

[11] Patent Number: 5,193,208
[45] Date of Patent: Mar. 9, 1993

[54] SIGNAL TRANSMISSION SYSTEM

[75] Inventors: Teppei Yokota, Chiba; Susumu Morioka, Saitama; Yoshihiro Machinguchi; Yuji Yamada, both of Tokyo, all of Japan

[73] Assignee: Sony Corporation, Japan

[21] Appl. No.: 691,986

[22] Filed: Apr. 26, 1991

[30] Foreign Application Priority Data

| May 14, 1990 | [JP] | Japan | 1-23317 |
| May 21, 1990 | [JP] | Japan | 1-30748 |
| May 23, 1990 | [JP] | Japan | 1-33228 |

[51] Int. Cl.$^5$ .............................................. H04H 1/00
[52] U.S. Cl. ........................ 455/4.1; 455/4.2; 455/6.3; 358/86; 370/73; 370/124; 340/825.24; 340/825.25
[58] Field of Search ................. 455/3, 4, 5, 6; 358/86; 381/81; 370/71, 73, 76, 124; 340/825.24, 825.25

[56] References Cited

U.S. PATENT DOCUMENTS

| 4,381,522 | 4/1983 | Lambert | 455/4 |
| 4,439,784 | 3/1984 | Furukawa et al. | 455/4 |
| 4,718,107 | 1/1988 | Hayes | 455/4 |
| 4,776,010 | 10/1988 | Noda et al. | 455/6 |
| 4,866,515 | 9/1989 | Tagawa et al. | 455/4 |
| 4,885,803 | 12/1989 | Hermann et al. | 455/4 |
| 4,930,120 | 5/1990 | Baxter et al. | 455/4 |

FOREIGN PATENT DOCUMENTS 2226890 9/1990 Japan .

Primary Examiner—Reinhard J. Eisenzopf
Assistant Examiner—Timothy H. Keough
Attorney, Agent, or Firm—Ronald P. Kananen

[57] ABSTRACT

A signal transmission system in which a variery of electronic apparatus which can transmit audio and/or video informations (AV informations) or the like are concentratedly installed is comprised of main control means for controlling a variety of electronic apparatus and sub-control means installed via cables within a plurality of sub-rooms so that the AV informations can be listened to and viewed through the main control means. In order to transmit much more informations within the narrow frequency band, the AV informations are allocated to predetermined channels and channel content information indicating the AV informations allocated to the respective channels and an owner information indicative of the sub-room of the owner who exclusively uses the electronic apparatus are frequency-multiplexed with the AV informations and transmitted. Therefore, data of a variety of sources can be transmitted within the narrow frequency band and a plurality of users can generally understand the present status of the limited sources and select informations, thus avoiding the system from being disturbed.

4 Claims, 23 Drawing Sheets

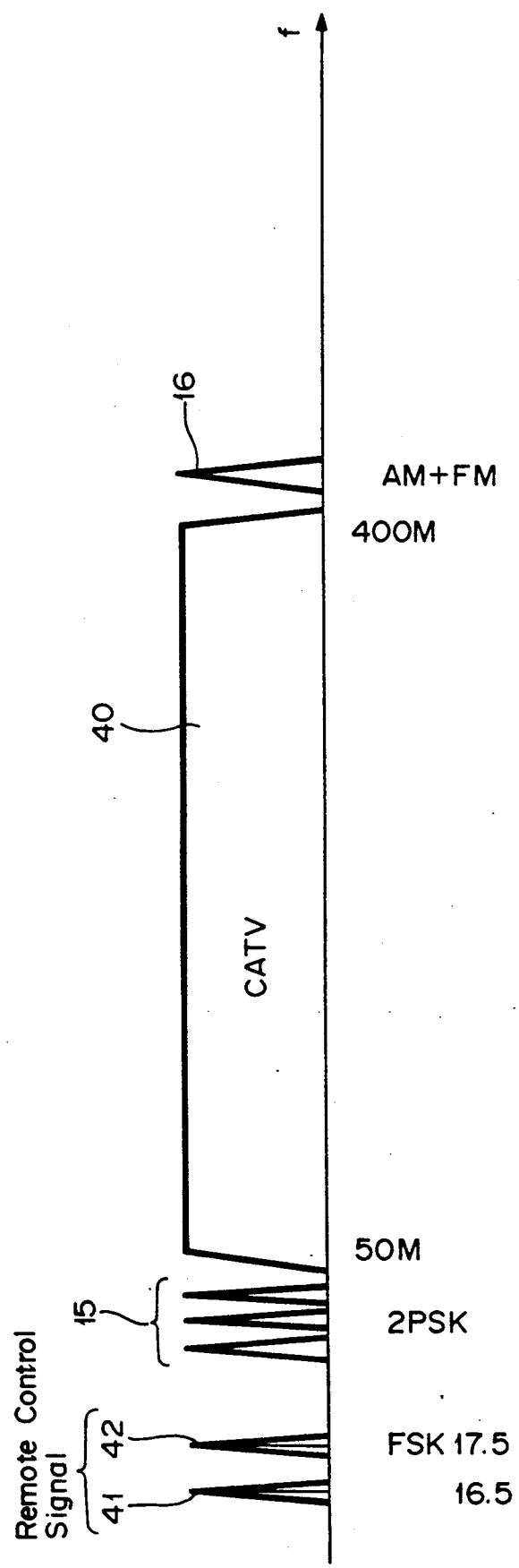

FIG. 6A

| Byte | Definition | |
|---|---|---|
| 0 | 0001 Sync. | } 41a |
| | 0000 Mode 1 | |
| 1 | 0000 Mode 2 | |
| | 0: Data Transmission<br>0: Video Transmission<br>0: Forced Reception<br>0: Page Utilized | |
| 2 | 0000 Forced Reception Channel | |
| | 0000 Page | |
| 3 | 0000 Data Transmission Room No. | |
| | 0000 Video Transmission Room No. | |
| 4 | 1 Sub-Room No. | |
| 5 | Reception Permission Flag<br>Sub-Room 15 | |
| 6 | 0 Sub-Room 0 | |
| 7 | Transmission Permission Flag<br>Sub-Room 15 | |

FIG. 6B

| Byte | Definition |
|---|---|
| 8 | Aux. / Frame (1/10 Sec. Unit, 0-9H) |
| 9 | Time Second (0-3BH) |
| 10 | Time Minute (0-3BH) |
| 11 | Time Hour (0-17H) |
| 12 | Date (01-1FH) |
| 13 | Month (01-0CH) |
| 14 | Year (After 1990) (0-FFH) |
| 15 | |

Bytes 9–11 bracketed as 41b; Bytes 12–15 bracketed as 41c.

FIG. 6C

| Byte | Definition | |
|---|---|---|
| 16 | Content of Channel 0 | |
| | Content of Channel 1 | |
| 17 | Content of Channel 2 | |
| | Content of Channel 3 | |
| 18 | Content of Channel 4 | |
| | Content of Channel 5 | |
| 19 | Content of Channel 6 | |
| | Content of Channel 7 | |
| 20 | Content of Channel 8 | |
| | Content of Channel 9 | |
| 21 | Content of Channel 10 | |
| | Content of Channel 11 | |
| 22 | ACK Flag | |
| 23 | | |

41d

Contents of Channel
0 : Not Used
1 : VTR 1
2 : VTR 2
3 : Tape 1
4 : Tape 2
5 : CD 1
6 : CD 2
7 : Tuner
8 : DAT
9 : PS
A : BS
B : Video 3
C : LD
D : MDP
E : MO
F :

FIG. 6D

| Byte | Definition |
|---|---|
| 24 | VTR 1 Owner Room No. |
| | VTR 2 Owner Room No. |
| 25 | Tape 1 Owner Room No. |
| | Tape 2 Owner Room No. |
| 26 | CD 1 Owner Room No. |
| | CD 2 Owner Room No. |
| 27 | Tuner Owner Room No. |
| | DAT Owner Room No. |
| 28 | PS Owner Room No. |
| | BS Owner Room No. |
| 29 | Video 3 Owner Room No. |
| | LD Owner Room No. |
| 30 | MDP Owner Room No. |
| | MO Owner Room No. |
| 31 | |

| Byte | Definition | |
|---|---|---|
| 32 | VTR1, VTR2, Tape1, Tape2, CD1, CD2, Tuner, DAT, PS, BS, Video3, LD, MDP, MO | Sub-Room Owner Flag<br>0: Absence of Owner<br>1: Presence of Owner |
| 33 | | |
| 34 | VTR1, VTR2, Tape1, Tape2, CD1, CD2, Tuner, DAT, PS, BS, Video3, LD, MDP, MO | Master Room Owner Flag<br>0: Not Used<br>1: Owner |
| 35 | | |

| Byte | Difinition | |
|---|---|---|
| 36 | Operation State of VTR 1 | |
| | Operation State of VTR 2 | |
| 37 | Operation State of Tape 1 | |
| | Operation State of Tape 2 | |
| 38 | Operation State of CD 1 | |
| | Operation State of CD 2 | |
| 39 | Operation State of Tuner | |
| | Operation State of DAT | |
| 40 | Operation State of PS | |
| | Operation State of BS | |
| 41 | Operation State of Video 3 | |
| | Operation State of LD | |
| 42 | Operation State of MDP | |
| | Operation State of MO | |

Operation State
0 : Power Off
1 : Stop
2 : Play
3 : Pause
4 : FF
5 : REW
6 :
7 :
8 :
9 :
A :
B :
C :
D :
E :
F :

| Byte | Definition |
|------|------------|
| 43   | ---------- |
| 124  | ---------- |
| 125  | ---------- |
| 126  | CRC        |
| 127  | CRC        |

Bytes 43–127: 41h

FIG. 7

| Byte | Definition | |
|---|---|---|
| 0 | 0 0 1 0 Sync.<br>0 0 0 0 Mode | 42a' |
| 1 | 0: Priority<br>0: Video Transmission<br>0: Data Transmission<br>0: Page Utilized<br>Room No. | 42b' |
| 2 | 0: 12 Bits  1: 15 Bits<br>Data Code (7 Bits)<br>SIRCS (15 or 12 Bits) | 42c' |
| 3 | Merchandise Code (8 Bits) | |
| 4 | Aux.<br>Page. | 42d' |
| 5 | Status (For Security) | |
| 6 | CRC | 42e' |
| 7 | | |

SIGNAL TRANSMISSION SYSTEM

BACKGROUND OF THE INVENTION

1. Field of the Invention

The present invention generally relates to a control system for controlling a plurality of electronic apparatus, such as a home bus system and, more particularly, is directed to a signal transmission system.

2. Description of the Prior Art

In recent years, a home bus system has been practically used in homes. This home bus system connects various different electronic apparatus such as, for example, a personal computer, illumination control terminals, gas leakage sensor and so on by a transmission cable and provides various controls on the apparatus. In addition, the assignee of the present application has previously proposed the Multi Link System (hereinafter simply referred to as an MLS) in which audio and video informations are distributed through wires from one room of a home to each room where the information can be selectively viewed and listened to. Japanese Patent Laid-open Publication No. 2-226890 describes this previously-proposed MLS which will be described below.

Of a plurality of rooms of a house, a basement or a parlor or the like, for example, is used as a Master Room. Within this Master Room, a plurality of electronic apparatus, for example, a CD (compact disc) player, tape cassette deck, a VTR (video tape recorder) or the like, a multi-link center such as a multi-preamplifier or the like to which these electronic apparatus are connected and which controls the same are concentratedly installed. Whereas, multi-link receivers are installed in other rooms through cables in order that audio information and video information from the above-mentioned plurality of electronic apparatus can be listened to and viewed by means of remote controllers. Thus, by operating the remote controller provided in each of the multi-link receivers, it is possible for the user selectively to view and listen to desired informations in each room from various electronic apparatus connected to the multi-link center in the master room.

In the above-mentioned MLS, audio informations and video informations (AV informations) from predetermined electronic apparatus within the Master Room are assigned to independent channels at various kinds of electronic apparatus and these informations are frequency-multiplexed and transmitted to respective rooms via the single cable. However, with the increase of electronic apparatus connected to the multi-link center, many independent channels are needed and many frequency bands also are needed in order to transmit AV informations. These frequency bands must be selected so as not to overlap frequency bands of television broadcast, AM and FM radio broadcasts, police wireless communication system or the like now available on a wide variety of countries. Therefore, it is requested that information as much as possible can be transmitted by means of less number of channels and within a narrower frequency band.

However, if the number of channels is reduced, then the kind of AV informations transmitted is restricted. To remove this disadvantage, the MLS must be designed so that the same AV informations can be listened to and viewed within a plurality of rooms. At that time, if the user in one room operates the remote controller, the supply of the same AV informations to other rooms is interrupted. There is then the risk that the whole MLS system will be disturbed.

OBJECTS AND SUMMARY OF THE INVENTION

Accordingly, it is an object of the present invention to provide an improved signal transmission system in which the aforenoted shortcomings and disadvantages of the prior art can be substantially eliminated.

More specifically, it is an object of the present invention to provide a signal transmission system in which audio and/or video informations from a plurality of electronic apparatus connected to a multi-link center can be transmitted by effectively utilizing channels of a limited number regardless of an increase in the number of electronic apparatus.

It is another object of the present invention to provide a signal transmission system in which the kind of electronic apparatus now being operated can be understood by sub-rooms.

It is still another object of the present invention to provide a signal transmission system in which an owner associated with various kinds of electronic apparatus and an owner room No. can be understood by sub-rooms, thus avoiding the occurrence of disturbance of the whole system.

It is a further object of the present invention to provide a signal transmission system which can be applied to a variety of home bus systems.

As an aspect of the present invention, a signal transmission system in which a variety of electronic apparatus which can transmit audio and/or video informations (AV informations) or the like are concentratedly installed is comprised of main control means for controlling a variety of electronic apparatus and sub-control means installed via cables within a plurality of sub-rooms so that the sub-control means can listen to and view the AV informations through the main control means. In order to transmit much more informations within the narrow frequency band, the AV informations are allocated to predetermined channels and a channel content information indicating the AV informations allocated to the respective channels and an owner information indicative of the sub-room of the owner who exclusively uses the electronic apparatus are frequency-multiplexed with the AV informations and transmitted. Therefore, data of a variety of sources can be transmitted within the narrow frequency band and a plurality of users can generally understand the present status of the limited sources and select informations, thus avoiding the system from being disturbed.

The above, and other objects, features and advantages of the present invention will become apparent in the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 4A and 4B are diagrams, respectively, used to explain a frequency allocation of a multi-link system and a frequency allocation of the present invention;

FIGS. 6A-6G are schematic diagrams showing definition of byte data of the first remote control signal of the present invention, respectively;

FIG. 7 is a schematic diagram showing definition of byte data of the second remote control signal of the present invention;

DETAILED DESCRIPTION OF THE PREFERRED EMBODIMENT

Figure 1A:
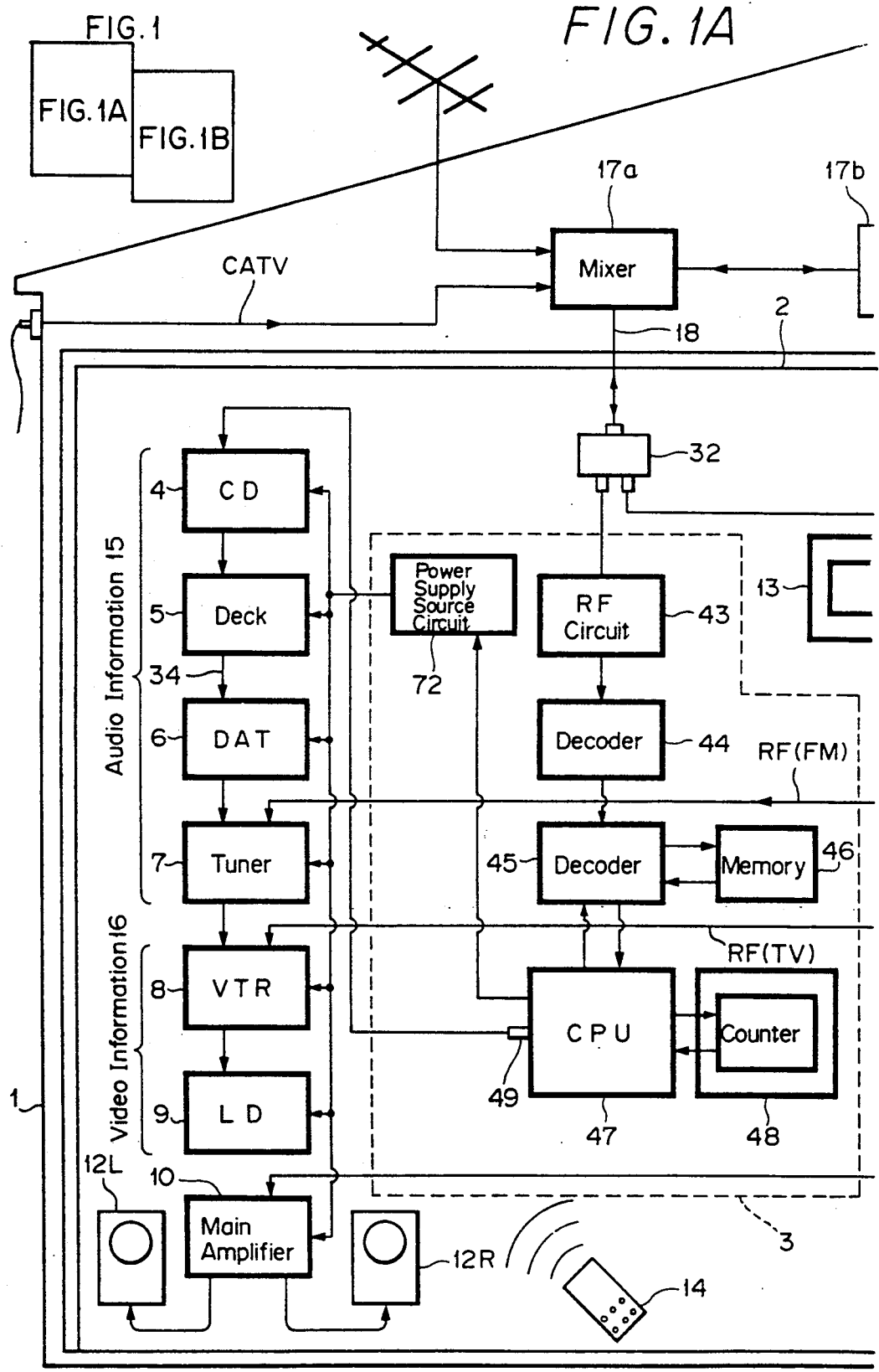
FIG. 1 (formed of FIGS. 1A and 1B) is a systematic block diagram showing an embodiment of a signal transmission system according to the present invention.
Figure 1B:
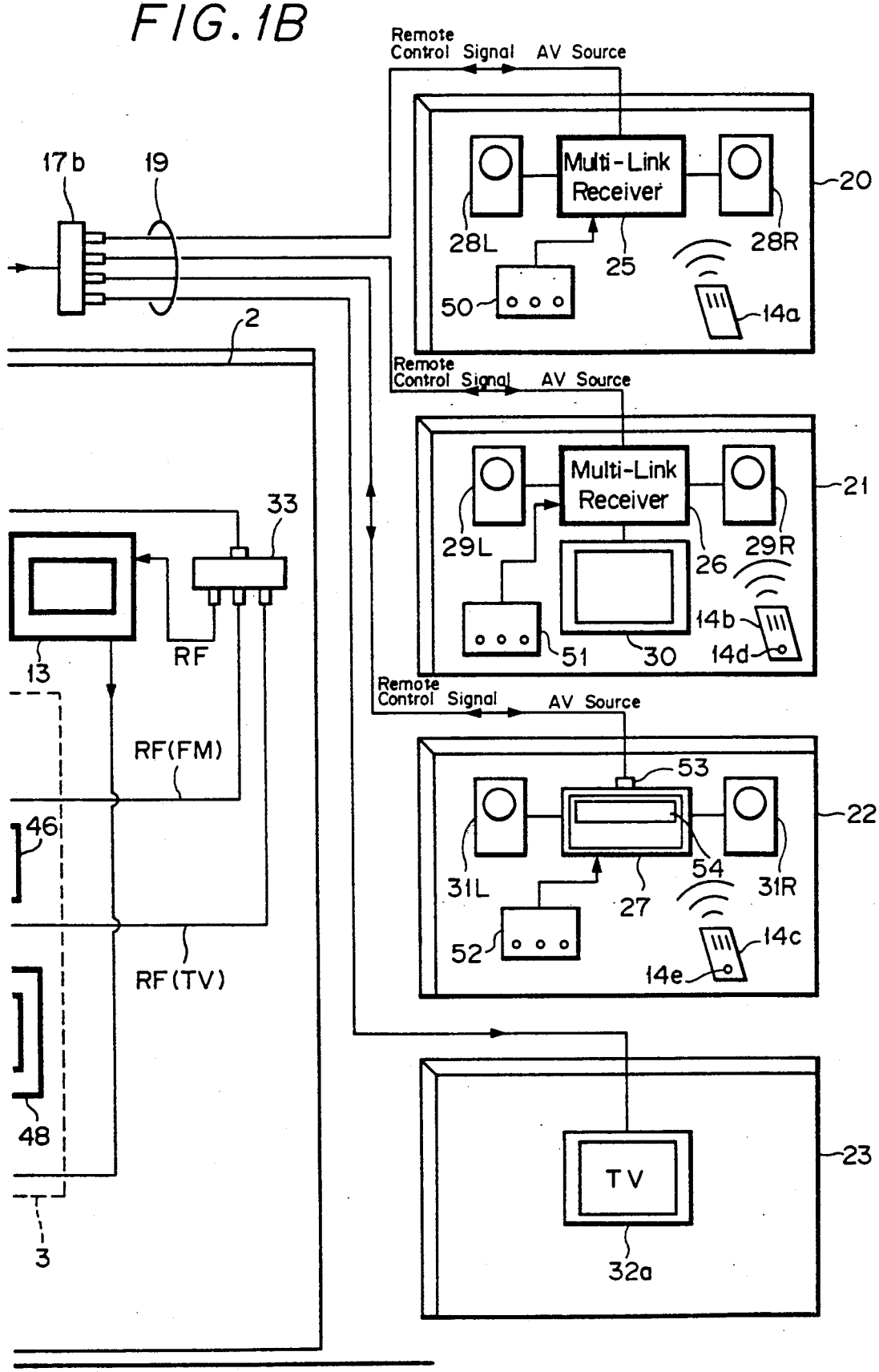

Referring to the drawings in detail, and initially to FIG. 1, the MLS (Multi-Link System) of the present invention will be described. In this case, FIG. 1 is formed of FIGS. 1A and 1B drawn on two sheets of drawings so as to permit the use of a suitably large scale.

As shown in FIG. 1, of a plurality of rooms of a house 1, a basement or a parlor, for example, is used as a master room 2, and a multi-link center 3 such as a multi-preamplifier or the like is installed within this master room 2. A plurality of apparatus to be driven by this multi-link center 3, for example, a CD player 4, a tape cassette deck 5, a DAT (digital audio tape) deck 6, an AM-FM tuner 7, a VTR 8, a laser disc player 9, a main amplifier 10 including left and right speakers 12L and 12R, a TV (television) receiver 13 and so on are concentratedly installed in the master room 2. Thus, even in the master room 2, desired audio information 15 and video information 16 can be listened to and viewed by the operation of a remote controller 14 or the like. The multi-link center 3 within the master room 2 is supplied with cable TV (CATV) information and so on through a mixer 17a and a cable 18. The audio information 15 and the video information 16 from the plurality of concentratedly installed apparatus within the master room 2 are distributed through the mixer 17a, a distributor 17b and a cable 19 to a plurality of sub-rooms 20, 21 and 22 so that these informations can be selectively listened to and viewed in these rooms by operating remote controllers 14a to 14c and operation units 50 to 52 mounted on the walls of the sub-rooms 20, 21 and 22 or the like. The sub-rooms 20 and 21 have multi-link receivers 25 and 26 provided therein, respectively. The multi-link receiver 25 in the sub-room 20 is provided with the left and right speakers 28L and 28R so that the user can listen to the audio information 15 from the CD player 4 or the like in the sub-room 20. The sub-room 21 has, for example, the multi-link receiver 26, the left and right speakers 29L, 29R and a TV receiver 30 provided therein so that the user can view the video information 16 from, for example, the VTR 8 by operating the remote controller 14b or the operation unit 51. In the sub-room 22, the audio information 15 from, for example, the DAT 6 or the like is supplied to an antenna terminal 53 of a TV receiver 27 which incorporates therein a multi-link receiver 54, which will be described later with reference to FIG. 10, so that the user can listen to the audio information 15 by a speaker (not shown) housed in the TV receiver 27 or left and right speakers 31L and 31R connected to the TV receiver 27 by operating the remote controller 14c or the operation unit 52. In the sub-room 23, a TV receiver 32a is provided so that CATV can be viewed thereon.

The RF signals of CATV and so on distributed by a two-output distributor 32 within the master room 2 are supplied to a three-output distributor 33, thereby being distributed as, for example, the RF signal of the TV to the TV receiver 13 for CATV and the RF signal of the VTR 8 or the like. Within the multi-link center 3 shown by a dashed-line block in FIG. 1, there are shown transmission lines of first and second remote control signals 41 and 42 (see FIG. 2) which are transmitted between each of the sub-rooms 20, 21 and 22 and the master room 2. The second remote control signal 42 from the remote controllers 14a to 14c and distributed by the two-output distributor 32 within the master room 2 has a carrier of 17.5 MHz and is RF-processed by an RF circuit 43. A first decoder 44 of the next stage decodes the second remote control signal 42 of 100 ms of time (see FIG. 2B) to provide data of particular bits. When the thus decoded data is supplied to the next second decoder 45, the second decoder 45 produces data of 64 bits indicative of one room unit as shown in FIG. 2C. The output of the second decoder 45 is supplied to a microcomputer (hereinafter referred to as a central processing unit (CPU)) 47. The CPU 47 can process the remote control signals 42 of 100 ms of time indicative of 16 rooms at a time and is provided with a memory 46 and a clock function (i.e., timer) 48. The CPU 47 also arranges data read out of the remote control signal of 64 bits of each sub-room. If the CD player 4 and the DAT 6 are found to be in the playback mode from the command state from the remote control signals 14a to 14c, then the CPU 47 raises flags on the table corresponding to the CD player 4 and the DAT 6 in the memory 46 and supplies control data with the flags raised from an output terminal 49 thereof to the CD player 4 and the DAT 6.

In the thus arranged MLS, the remote control signal from the remote controllers 14a to 14c and transmitted and received between the multi-link center 3 and the multi-link receivers 25, 26 and the TV receiver 27 of the respective sub-rooms 20, 21 and 22 might be a control signal of SIRCS (Sony Infrared Remote Control System) which the assignee of the present application creates and employs for the remote control of audio visual apparatus. The SIRCS remote control signal has a format of infrared digital code system and a code format thereof is represented in FIG. 3.

Figure 3:
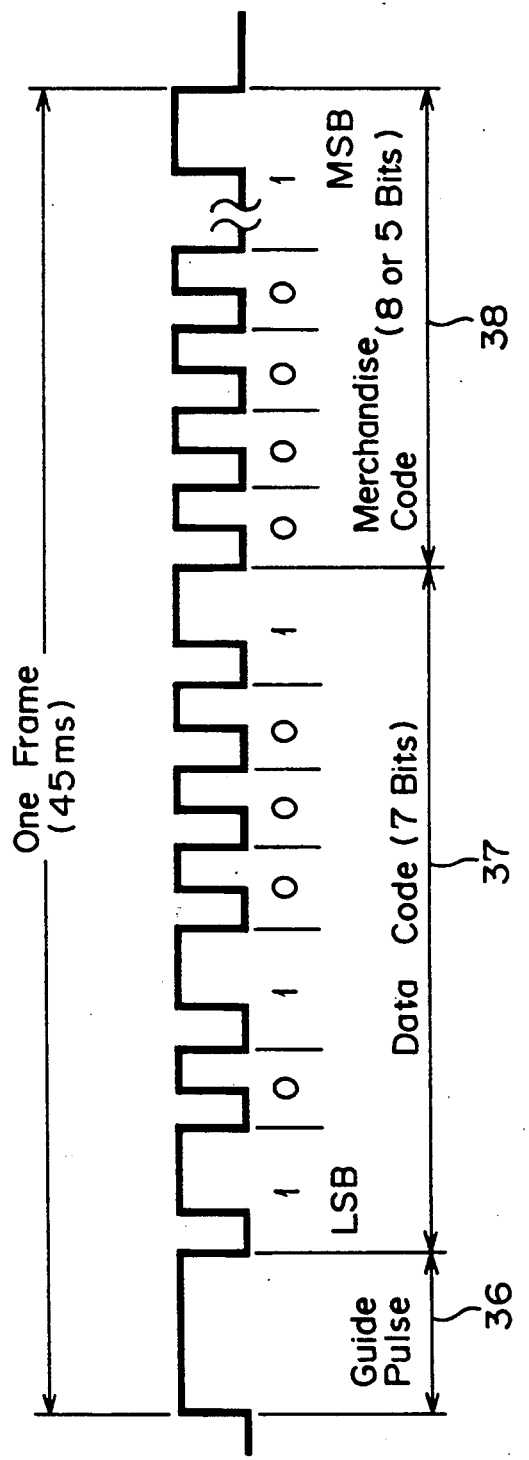
FIG. 3 is a schematic diagram used to explain a format of a remote control signal of an infrared digital code system of the present invention.

As shown in FIG. 3, the format of one frame (45 ms) is normally formed of 15 bits (or 12 bits) which includes a guide pulse 36 as an identification (ID) signal for specifying the start, a data code 37 of binary code of 15 bits (or 12 bits) which begins at 2° following the guide pulse 36 and which indicates the control function by 7 bits and a merchandise code 38 of 8 bits (or 5 bits) indicative of merchandise category, following the data code 37. When the audio and video informations from audio and video information sources within the master room 2 are viewed and listened to in the respective sub-rooms 20, 21 and 22 by using the SIRCS control signals, if the multi-link center 3 is requested to transmit AV informations of, for example, the CD player 4, the DAT deck 6, the VTR 8 and the laser disc player 9 by the remote controllers 14a to 14c of the respective sub-rooms 20, 21 and 22, then the multi-link center 3 arranges the SIRCS control signals from these remote controllers requested, respectively. Although one frame of this SIRCS control signal is 45 ms of time as shown in FIG. 3, coincidences of more than twice (i.e., 2 frames) should be made in order to detect the SIRCS control signal more reliably.

As described above, the audio information 15 and the video information 16 demanded can be substantially simultaneously transmitted from the multi-link center 3 side to the respective sub-rooms 20, 21 and 22 in response to the commands of the SIRCS control signals from the plurality of sub-rooms 20, 21 and 22. The audio information 15 and the video information 16 are frequency-multiplexed via the single cable 18.

A frequency allocation of the thus frequency-multiplexed data will be described with reference to FIGS. 4A and 4B.

In FIG. 4A, reference numeral 40 represents a frequency band of 45 MHz to 370 MHz including, for example, channels 2 to 50 of frequency-modulated (FM) CATV. The AV (audio video) informations used in the MLS of this embodiment are allocated above and below this CATV band. More specifically, the video information 16 is an analog signal which is AM- and FM-modulated and allocated on the high band side of the CATV band, and the audio information 15 is digitized, two-phase modulated (i.e., 2PSK: phase shift keying), and allocated on the low band side of the CATV band. The audio information 15 and the video information 16 are both modulated in a frequency multiplex fashion. In this case, the audio information 15 of 3 channels is prepared and the video information 16 of one channel is prepared, and the first remote control signal 41 for remote control operation is digitally frequency-modulated (FSK: frequency shift keying). The carrier of the first remote control signal 41 is selected to be, for example, 16.5 MHz and the carrier of the second remote control signal 42 is selected to be, for example, 17.5 MHz as shown in FIG. 4A. These first and second remote control signals 41 and 42 are modulated in a timebase multiplex fashion. The first remote control signal 41 is used to perform the control from the master room 2 side to the respective sub-rooms 20, 21 and 22 side, while the second remote control signal 42 is used to perform the control operation from the remote controllers 14a to 14c of the respective sub-rooms 20 to 22 to the multi-link center 3 side of the master room 2.

Audio information channeling and video information channeling will be described in detail with reference to FIGS. 4B.

Figure 4B:
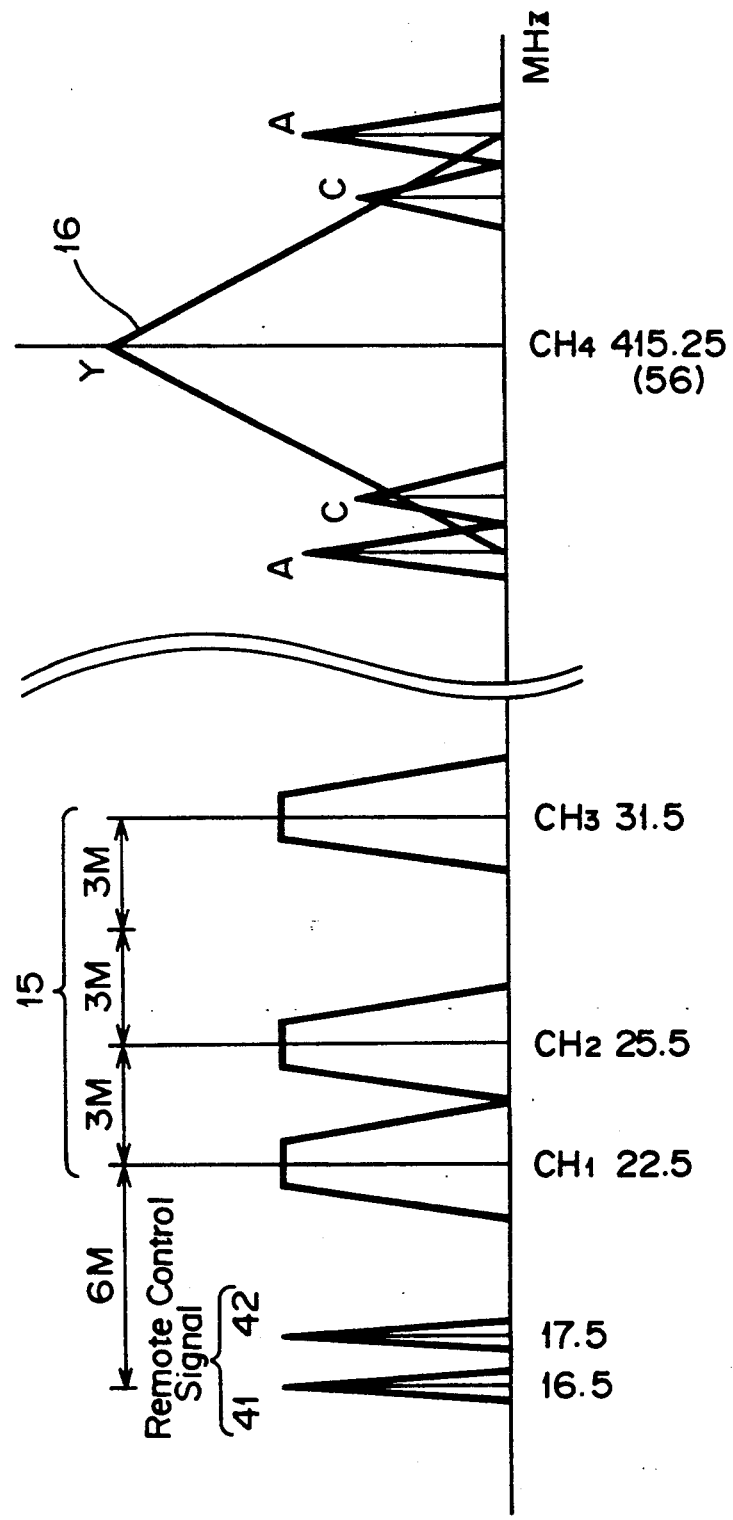

As shown in FIG. 4B, the audio information channel is composed of a first audio information channel (hereinafter simply referred to as a $CH_1$) whose carrier frequency is 22.5 MHz that is distant from the first remote control signal 41 by 6 MHz, a second audio information channel (hereinafter simply referred to as a $CH_2$) whose carrier frequency is 25.5 MHz that is distant from the carrier frequency of the first audio information channel $CH_1$ by 3 MHz, and a third audio information channel (hereinafter simply referred to as a $CH_3$) whose carrier frequency is 31.5 MHz that is distant from the carrier frequency of the second audio information channel $CH_2$ by 6 MHz. In that case, through the first to third audio channels $CH_1$ to $CH_3$, audio informations are converted into digital data and then transmitted.

A video information channel (hereinafter simply referred to as a $CH_4$) is allocated above the frequency band of the CATV channel 40 and has a carrier frequency of 415.25 MHz. In this case, through the video information channel $CH_4$, as shown in FIG. 4B, a luminance signal Y and a chroma signal C forming a video signal are transmitted in a frequency multiplex fashion and an audio signal A, which is reproduced simultaneously with the video signal, is frequency-modulated with the analog audio signal and transmitted in a frequency multiplex fashion.

Figure 5:
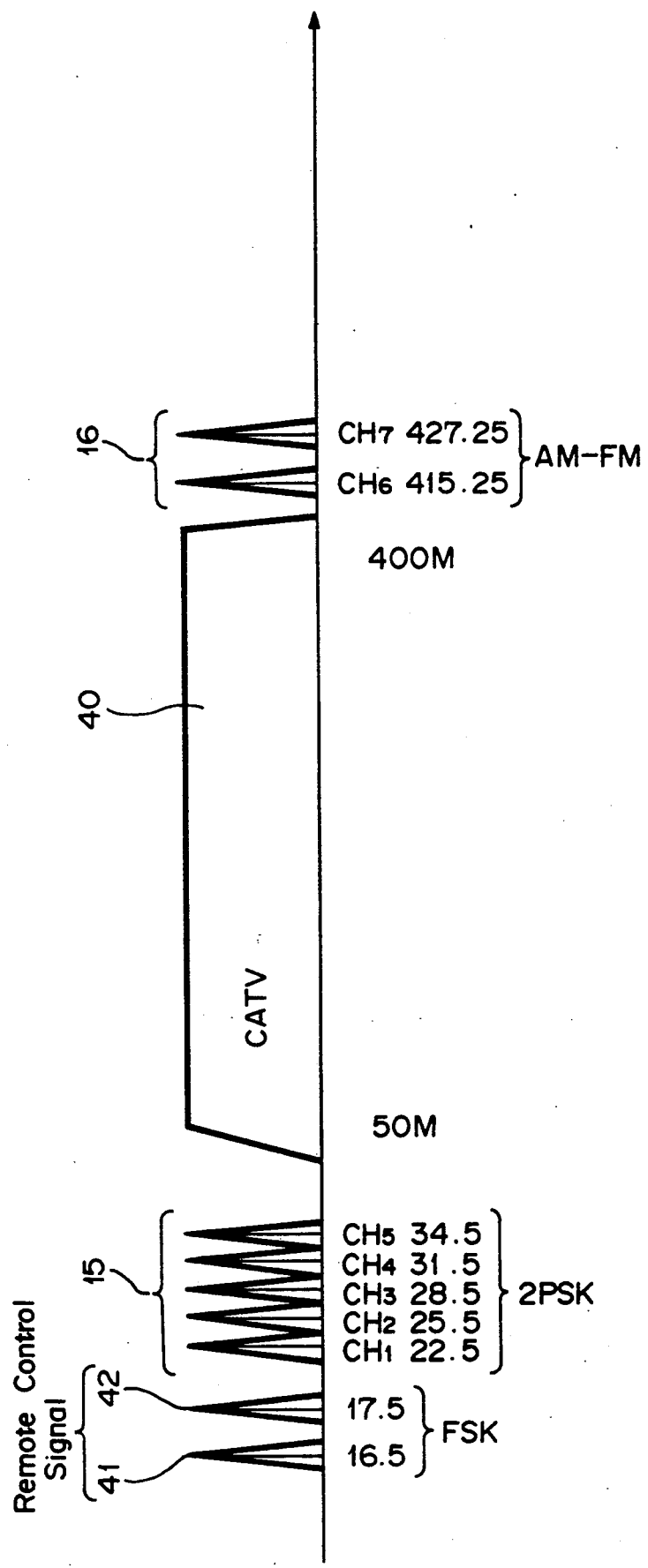
FIG. 5 is a diagram showing a frequency allocation of a multi-link system according to the prior art.

FIG. 5 shows a frequency allocation of the prior art. As shown in FIG. 5, as the video information 16 there are allocated on the high band side of the CATV band 40 sixth and seventh channels $CH_6$ and $CH_7$ whose central frequencies are respectively 415.25 MHz and 427.25 MHz which are distant from each other by 12 MHz. Further, as the audio information 15 there are allocated on the low band side of the CATV band 40, for example, first to fifth channels whose central frequencies are 22.5 MHz, 25.5 MHz, 28.5 MHz, 31.5 MHz and 34.5 MHz and which are distant apart by 3 MHz each are selected. Then, the video information 16 and the audio information 15 are assigned to independent data transmission channels $CH_1$ to $CH_5$ of every source of various kinds of electronic apparatus 4 to 9 shown in FIG. 1. As a result, many independent channels are needed with the increase of the apparatus, which unavoidably needs a large number of bands in order to transmit the audio information 15 and the video information 16.

Figure 2A:
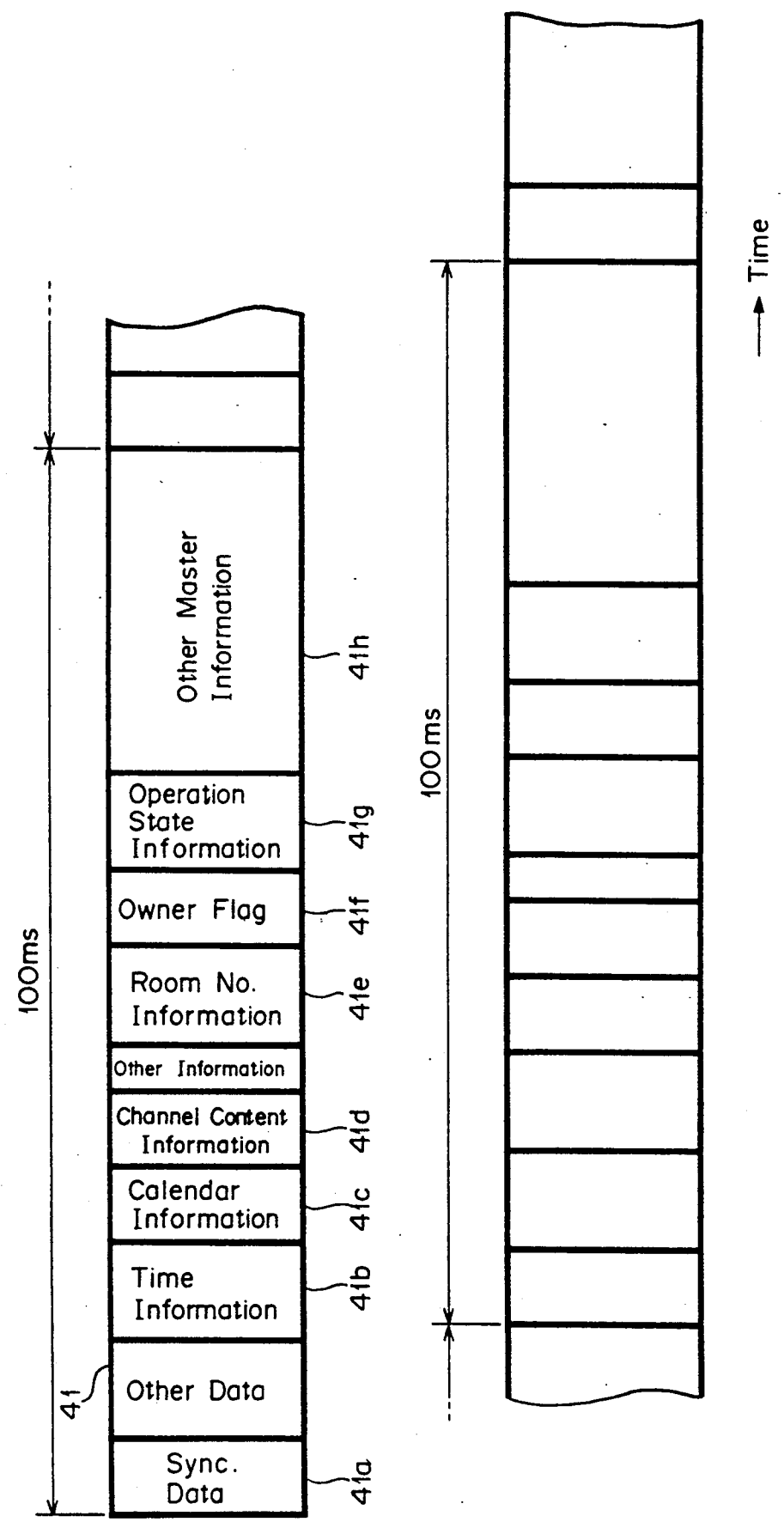
FIGS. 2A–2C are diagrams, respectively, showing signal formats of first and second remote control signals used in the present invention.
Figures 2B, 2C:
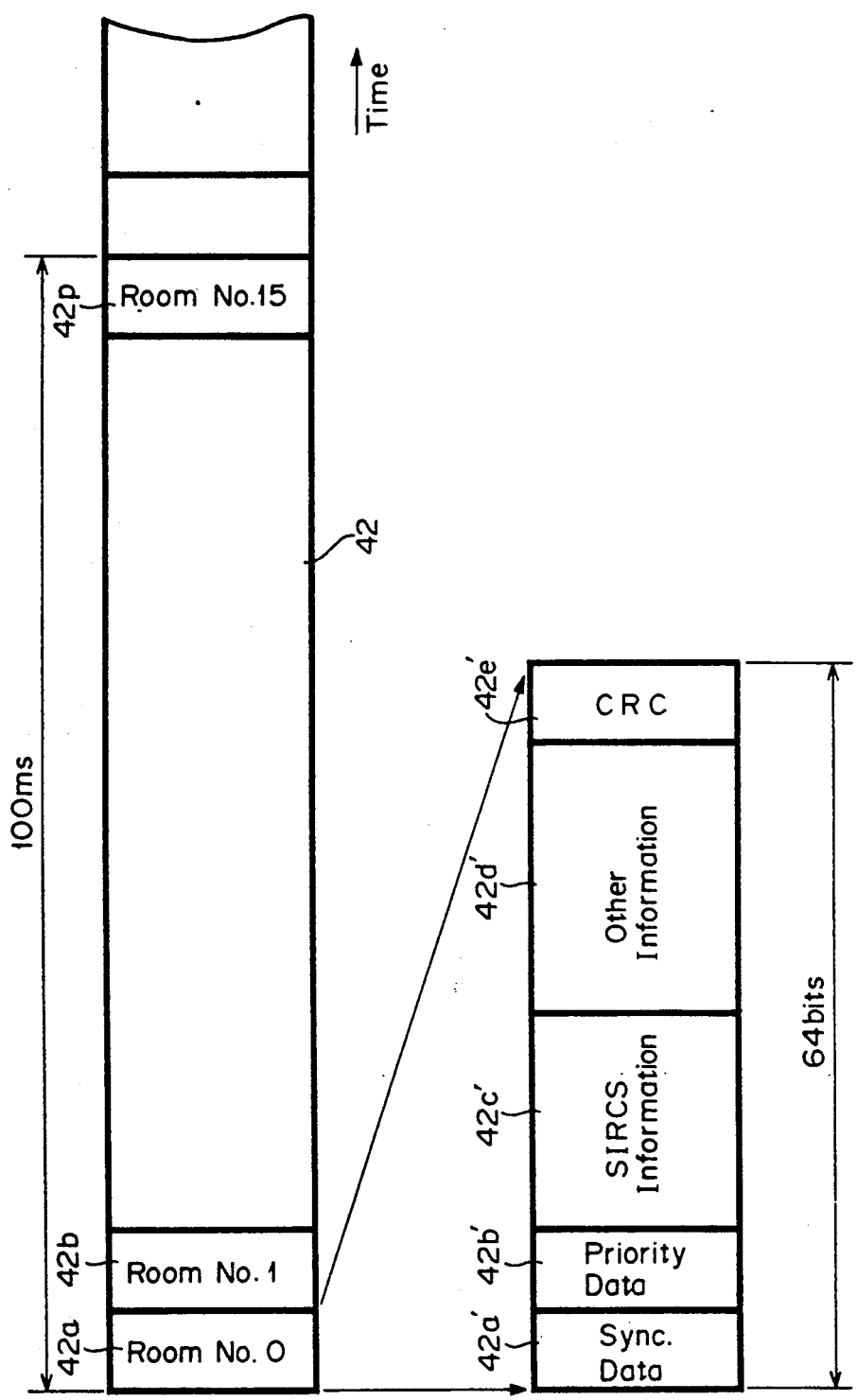

FIGS. 2A and 2B are diagrams showing the formats of the first and second remote control signals 41 and 42 shown in FIGS. 4A and 4B, respectively.

FIG. 2A shows the first remote control signal 41 formed of data of 128 bytes at every 100-ms of time. The first remote control signal 41 is composed of at the head thereof a synchronizing (sync.) signal 41a, data transmission room number, video transmission room number, sub-room reception permission flag, sub-room transmission permission flag or the like of 0'th to 7th bytes, time and calendar informations 41b and 41c of 8th to 14th bytes, channel content informations (i.e., data indicative of the kinds of electronic apparatus which transmit informations) 41d of 16th to 21st bytes, owner room No. data 41e of 24th to 31st bytes indicating the owner sub-room room number, owner flag 41f formed of 32nd to 35th bytes responsive to various electronic apparatus 4 to 9 provided as the sources to indicate whether or not the owner exits within the sub-rooms 20, 21 and 22 and within the master room 2, operation state information 41g formed of 36th to 42nd bytes indicating operation conditions of various electronic apparatus such as power on, stop, playback, pause, fast forward, rewind or the like, master information 41h or the like formed of other remaining bytes as shown in FIGS. 6A to 6F. The first remote control signal 41 including these informations is transmitted to the multi-link receivers 25 and 26 of the respective sub-rooms 20, 21 and 22 and to the television receiver 27.

FIG. 2B schematically shows the format of the second remote control signal 42, and as shown in FIG. 2B, data of 1024 bits is transmitted in 100 ms of time as control data 42a, 42b, . . . , 42p from the 1st to 16th rooms. As shown in FIG. 2C, data of each sub-room is data of 64 bits which are composed of at the head thereof a synchronizing (sync.) signal 42a', priority data 42b', above-mentioned SIRCS data 42c' of 12 to 15 bits, other security status data 42d' and a cyclic redundancy check (CRC) data 42e' and which are timebase-compressed.

FIG. 7 is a schematic diagram showing the definition of 8-byte (64-bit) data shown in FIG. 2C. As shown in FIG. 7, a priority bit is assigned to the first bit of the second byte and is used as a priority flag. This priority flag is "1" for the sub-room having priority and is "0" for the sub-room having no priority, and is transmitted from each of the sub-rooms 20 to 22 to the master room 2.

Figure 8A:
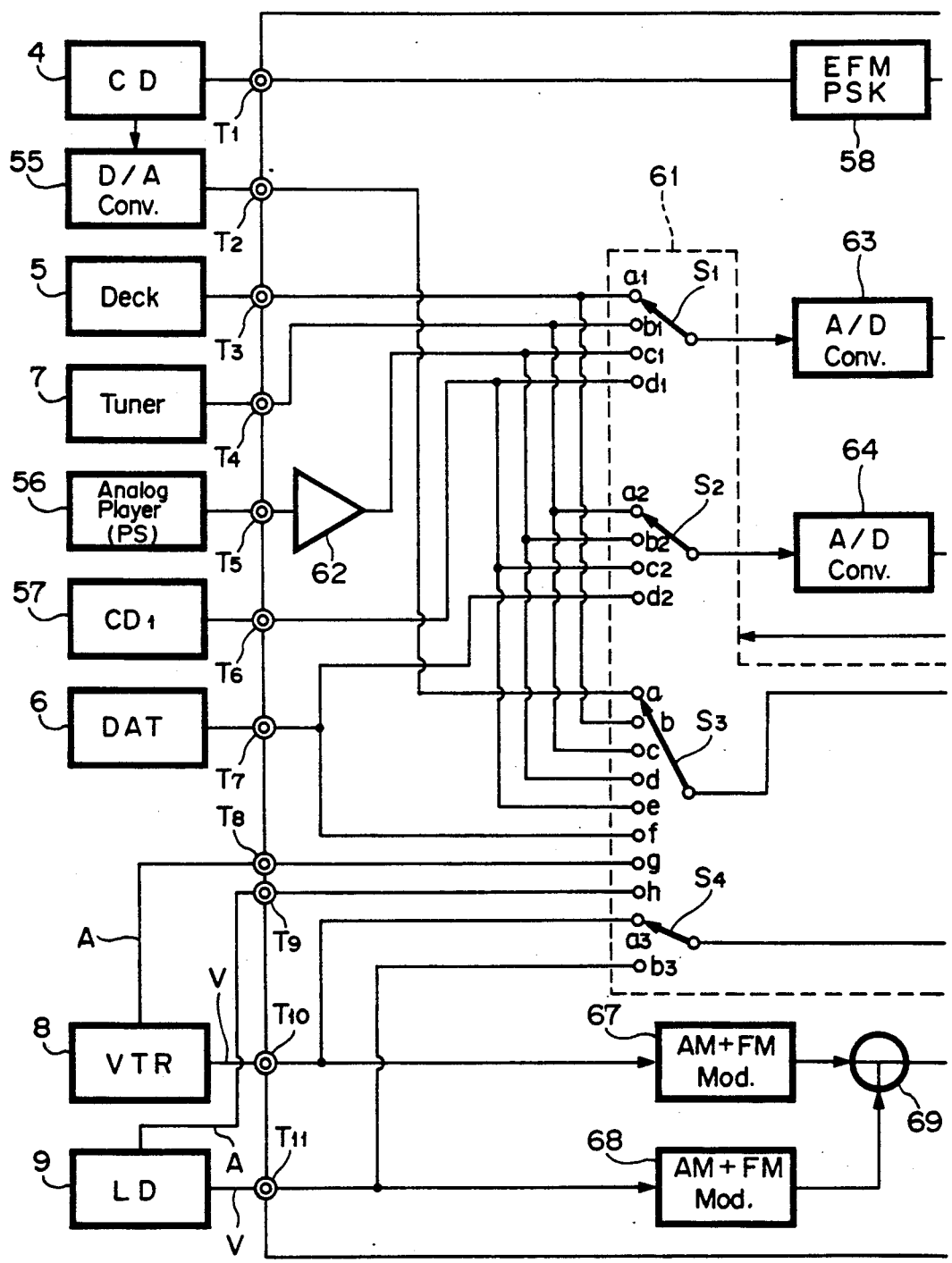
FIG. 8 (formed of FIGS. 8A and 8B) is a systematic block diagram showing an arrangement of a master room according to the embodiment of the present invention.
Figure 8B:
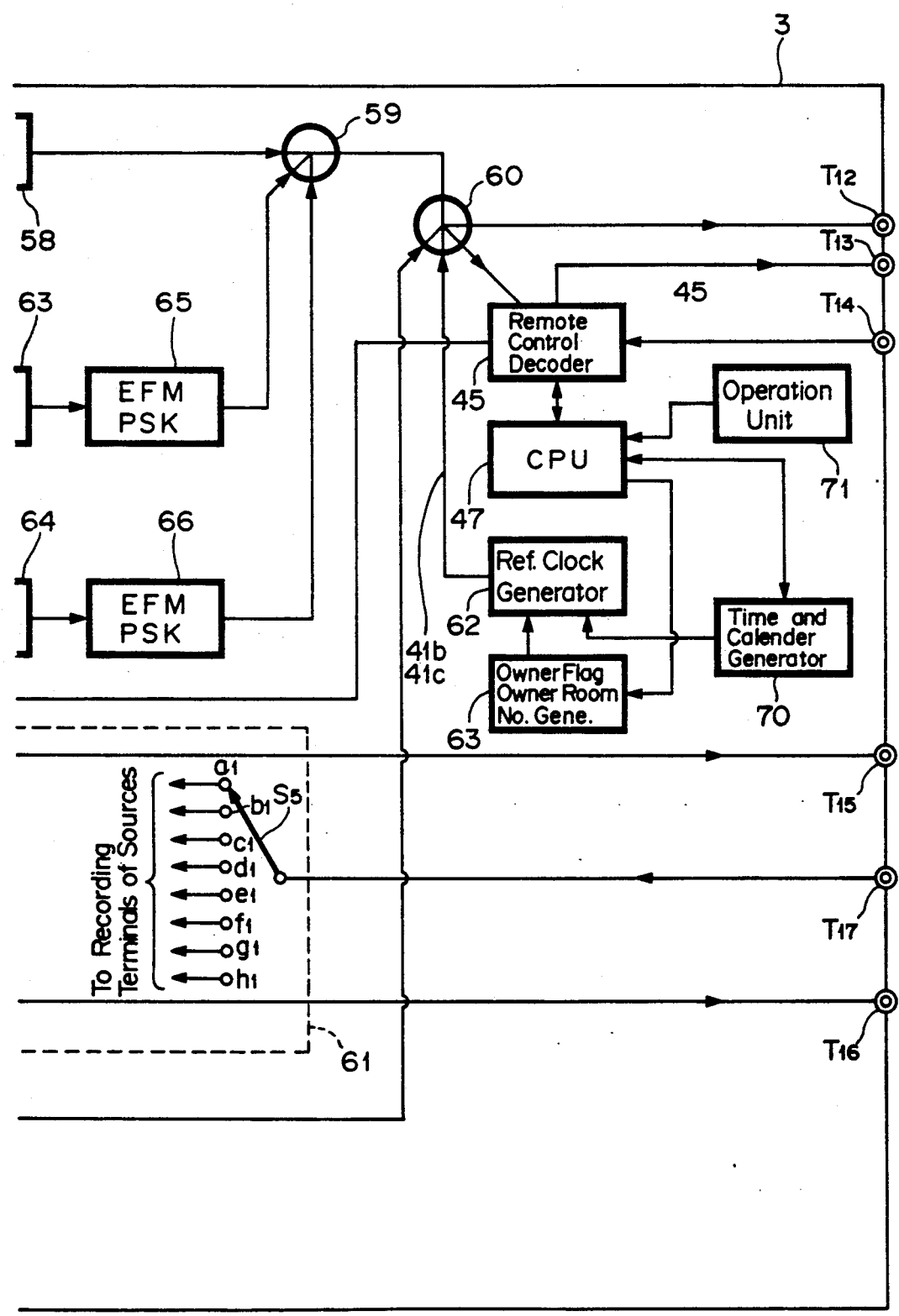

FIG. 8 (formed of FIGS. 8A and 8B) is a block diagram showing the arrangement of the inside of the multi-link center 3 at the master room 2 side of the MLS shown in FIG. 1. In FIGS. 8A and 8B, like parts corresponding to those of FIG. 1 are marked with the same references and therefore need not be described in detail.

Referring to FIGS. 8A and 8B, output signals from various kinds of electronic apparatus 4 to 9 concentratedly installed within the master room 2 are supplied to input terminals $T_1$ to $T_9$ within the multi-link center 3, respectively. More specifically, analog or digital audio informations 15 such as a digital output from, for example, the CD player ($CD_1$) 4, an analog signal, which results from digital-to-analog converting the digital output from the CD player ($CD_1$) 4 by a D/A converting circuit 55, signals from the tape deck 5 such as the tape recorder or the like, the tuner 7, an analog disc player (PS) 56, a CD auto changer ($CD_1$) 57 and the DAT deck (DAT) 6, the VTR 8, the laser disc player (LD) 9 or the like are supplied to the input terminals $T_1$ to $T_9$. Video signals V from the VTR 8 and the LD 9 are supplied to input terminals $T_{10}$ and $T_{11}$, respectively. The digital data supplied to the input terminal T1 from the CD player (CD) 4 is modulated by an eight-to-fourteen modulating/phase shift keying (EFM/PSK) circuit 58 and is fed through a mixer 59 and a mixing distributor 60 to a terminal $T_{12}$. The output from the terminal $T_{12}$ is distributed to the sub-rooms 20, 21, 22 and 23 by means of the distributor 17b shown in FIG. 1. The output signals supplied to the input terminals $T_3$ to $T_6$ from the deck 5, the tuner 7, the PS 56 and the CD auto changer ($CD_1$) 57 are supplied to fixed contacts $a_1$ to $d_1$ of a first switch S1 of switching means 61. Incidentally, the output of the PS 56 is supplied through a preamplifier 62 or the like to a fixed contact $c_1$ of the first switch S1. A signal from the movable contact of the first switch S1 is converted into a digital signal by an analog-to-digital (A/D) converting circuit 63, modulated by an EFM/PSK circuit 65 and transmitted through the mixer 59 and the mixing distributor 60 to the sub-rooms 20, 21, 22 and 23 as data. Similarly, the output signals from the tuner 7, the PS 56, the $CD_2$ 57 and the DAT 6 are supplied to fixed contacts $a_2$ to $d_2$ of a second switch S2 of the switching means 61, and the signal from the movable contact of the second switch S2 is converted into digital data by an A/D converter 64, modulated by an EFM/PSK circuit 66 and transmitted to the respective sub-rooms 20, 21, 22 and 23 through the mixer 59 and the mixing distributor 60 from the terminal $T_{12}$ as audio information.

The analog signal, which results from digital-to-analog converting the output data of the CD 4 by the D/A converting circuit 55 and the audio informations 15 from the deck 5, the tuner 7, the PS 56, the $CD_2$ 57, the DAT 6, the VTR 8 and the LD9 are respectively supplied to fixed contacts a to h of a third switch S3 of the switching means 61. The signal from the movable contact of the third switch S3 is supplied to an output terminal $T_{16}$ and outputted from the master room 2, in order that the audio informations 15 from various kinds of electronic apparatus can be listened to. Fixed contacts $a_1$ to $h_1$ of a fifth switch S5 of the switching means 61 are similarly connected to recording terminals of the sources 5, 6, 8 or the like and connected through a movable contact to a terminal $T_{17}$, thereby being used to record the audio informations 15 from these sources within the master room 2. A fourth switch S4 of the switching means 61 is used to selectively switch the video signals v from the VTR 8 and the LD 9, and the movable contact of the fourth switch S4 is connected to a terminal $T_{16}$, thereby being used to monitor the video signal within the master room 2. The video signals V and the audio signals A from the VTR 8 and the LD9 are supplied to the input terminals $T_8$ to $T_{11}$ of the multi-link center 3 and distributed to the third and fourth switches S3 and S4, and are also supplied to AM+FM modulating circuit 67 and 68, respectively, thereby being modulated. The modulated signals are supplied through a mixer 69 and the mixing distributor 60 to the terminal $T_{12}$, from which the video and audio signals are distributed to the sub-rooms 20, 21, 22 and 23, respectively. The switching means 61 is controlled by a remote control signal decoder 45, and the second remote control signal 42 from each of the sub-rooms 20 to 23 is supplied through the terminal $T_{12}$ and the mixing distributor 60 to the remote control signal decoder 45. From a terminal T13, a decoded output of the remote control signal decoder 45 is supplied through a control line 34 (see FIG. 1) to various electronic apparatus such as the CD 4, the DECK 5 or the like within the master room 2 as the SIRCS signal. A terminal $T_{14}$ is supplied with the command (SIRCS signal) transmitted from the remote commander 14 within the master room 2, and the decoded output from the remote control signal decoder 45 is supplied to the CPU 47 so as to supply and receive the control signal between the decoder 45 and the CPU 47.

Further, signals such as "owner room No." 41e, "owner flag" 41f or the like of the first remote control signal 41 transmitted from the master room 2 side to the respective sub-rooms 20, 21, 22 and 23 are generated from an owner room No./owner flag generating circuit 63 which is controlled by the CPU 47. On the basis of these signals, a predetermined clock is generated from a reference clock generating circuit 62 and supplied through the mixing distributor 60 to the respective sub-rooms 20 to 23. In the multi-link center 3, a time/calendar generating circuit 70 is connected to the CPU 47 via bus lines or the like, and an operation unit 71 having an input key pad for setting calendar, time and so on is connected to the CPU 47. The "time information 41b and the "calendar information" 41c from the time/calender generating circuit 70 are transmitted to the multi-link receivers 25, 26 or the like in the sub-rooms 20 to 22 side together with other signals such as the "owner room No." and the "owner flag" 41f as the first remote control signal 41 and used to control timers of these multi-link receivers 25, 26 or the like and to display time and so on.

An example of operation of the above-mentioned signal transmission system will be described below.

When playback request commands such as playback of the CD 4 and the playback of the DECK or the like 5 are transmitted to the remote control signal decoder 45 by the remote controllers 14a and 14b of the sub-rooms 20 and 21 from the sub-rooms 20 and 21 through the terminal $T_{12}$ and the mixing distributor 60 within the multi-link center 3, the remote control signal decoder 45 supplies the CPU 47 with these commands. The CPU 47 controls the respective switches S1, S2, S3 and S4 of the switching means 61 through the remote control signal decoder 45 to thereby assign information transmission channels to output the audio information 15 and the video information 16 from the selected sources. The audio information 15 is digitized, modulated in the EFM/PSK fashion and supplied to the mixing distributor 69, in which it is added with the first remote control signal 41 involving the "owner room No." 41e, the "owner flag" 41f, the "time information" 41b, the "calendar information" 41c or the like and transmitted through the terminal $T_{12}$ to the respective sub-rooms 20 and 21 together with the audio informations 15 of the CD 4 and the DECK 5. It is needless to say that the audio information 15 can be listened to in other sub-room 22 or the like. Under this reproducing condition, the multi-link center 3 of the master room 2 sets "1" in the sub-room owner flags of the CD 4 and the DECK 5 (see FIG. 6A) and transmits the same to the multi-link receivers 25 and 26 and the TV receiver 27 of the respective sub-rooms.

In the above-mentioned reproducing condition, even when the listener in the sub-room 22 wants to stop the CD player (CD) 4 in order to listen to other audio information (other music) and then the stop code is transmitted by pushing the stop key 14e of the remote controller 14c, the CPU 47 of the multi-link center 3 at the master room 2 side neglects the CD player stop request command from the sub-room 22 because the owner of the sub-room 20 has a right to use the CD 4. Simultaneously, if the audio information 15 from the tuner 7 is recorded by the DAT 6 through the switch S5 and the terminal $T_{17}$ and if the PS 56 or the like is reproduced by using the remote controller 14c within the master room 2, then the CPU 47 sets "1" to the flags of the TUNER, DAT and PS of 34th and 35th bytes shown in FIG. 6E and transmits the same to the multi-link receivers 25, 26 and the TV receiver 27 of the respective sub-rooms 20, 21 and 22. Further, informations indicative of the facts that the owner room No. of the DECK 5 is the sub-room 20 and that the owner room No. of the CD 4 is the sub-room 21 are transmitted to the sub-rooms 20 to 22 by using data of 25th and 26th bytes as shown in FIG. 6D. Furthermore, informations indicative of the facts that the owner room number of the TUNER 7, the owner room number of the DAT 6 and the owner room number of the PS 56 are all the master room 2 are also transmitted to the respective sub-rooms 20 to 22 by using data of 25th, 27th and 28th bytes as shown in FIG. 6D.

The multi-link receivers 25 and 26 of the sub-rooms 20 and 21 are provided with display means formed of light emitting elements such as LED (light emitting diode) or the like to thereby display the existence of the owner in other sub-room or the master room corresponding to various kinds of electronic apparatus and the owner room No. To this end, the multi-link receivers 25 and 26 are designed so as to display the owner and the owner room No. on the display means by receiving the owner flag "1", thus avoiding disturbance such as when the audio information or the video information reproduced by other sub-room is stopped. It is needless to say that, if data in the sub-rooms are displayed on the TV receivers 27 and 30 or the like without using the LED or the like, then the data can be displayed more in detail.

Since the "owner flag" and the "owner room No." are transmitted from the master room 2 side to the sub-rooms 20 to 23 together with the audio and video informations, the user of the remote controller on the sub-room side can understand the operation condition of the whole of the MLS. Further, when the audio information 15 and the video information 16 listened to and viewed on the sub-room side are powered off or when other source is selected on the sub-room side, the owner flag "1" of the corresponding sub-room is changed to "0" and the owner room No. is erased to thereby erase the right to select the audio or video information. However, when the owner of the sub-room 22 shown, for example, in FIG. 1 transmits the stop code of the tape deck (DECK) 5 by pushing the stop key 14e of the remote controller 14c, if the CPU 47 on the master room 2 side looks up "$1_H$" of "STOP" condition within the operation condition information 41g shown in FIG. 6E and immediately places the DECK 5 into the stop mode, it is cannot be determined whether the DECK 5 is really placed in the stop mode or whether the DECK 5 is placed in the stop mode during the fast forward (FF) mode or the rewind (REW) mode. That is, it is frequently observed that the user intends to continuously use the DECK 5 even though the DECK 5 is placed in the stop mode for the fast forward (FF) operation or for the rewind (REW) operation or after the DECK 5 is in the stop mode for several minutes. Therefore, according to this embodiment, a counter of the timer 48 (see FIG. 1) within the CPU 47 is started under the condition such that the stop code is read in. If the play (PLAY) code is not supplied from the sub-room 22 after the counter 48 counts a predetermined time, or after 10 minutes, for example, passed, the CPU 47 determines that the owner of the sub-room 22 has no intention of continuously utilizing the present DECK 5, and increments the counter. During the above predetermined time, i.e., 10 minutes, the owner of the sub-room 22 can keep the using right to select the DECK 5 and the owner flag "1" is continuously raised. However, if the playback command is not supplied during 10 minutes, the owner flag "1" is changed to "0" so that the owner loses the using right. Further, any one of the remote controllers 14a to 14c of the sub-rooms 20 to 22 and the remote controller 14 of the master room 2 is provided with a priority key (not shown) so that, when this priority key is pushed, a flag is raised in the priority bit within the priority data 42b' shown in FIG. 7.

Figure 9:
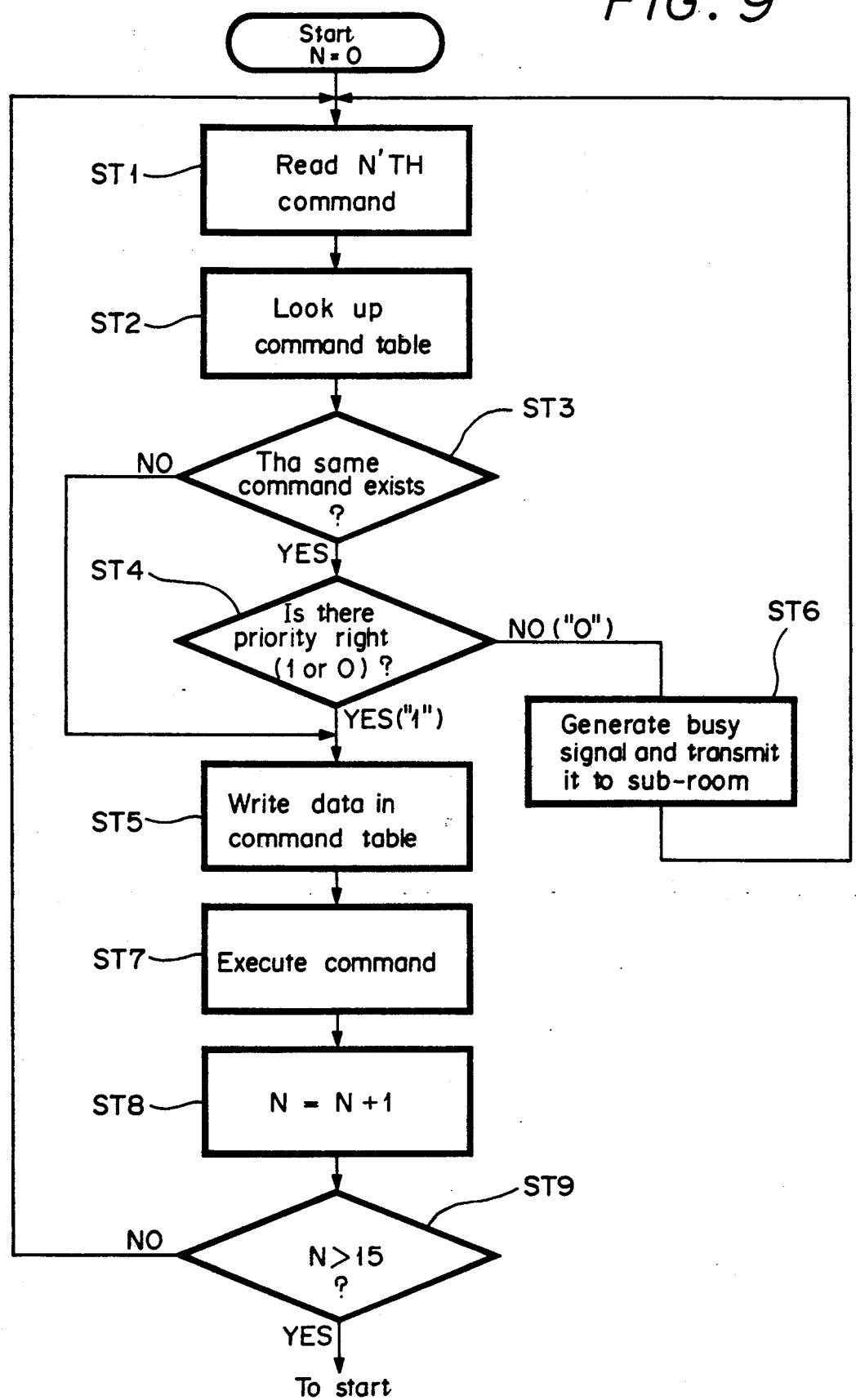
FIG. 9 is a flowchart to which references will be made in explaining operation of the embodiment of the signal transmission system according to the present invention.

FIG. 9 is a flowchart of the above priority processing. Referring to FIG. 9, in first step ST1, the first sub-room 0 in the control data 42a, 42b ... 42p of the respective sub-rooms 0 to 15 shown in FIG. 2B, that is, command of N=0 is read by the CPU 47, and in step ST2, flags within the command table within the memory 46 of the CPU 47 are examined. It is determined in the next decisions step ST3 whether or not the same command exists. If a NO is output at step ST3, then the processing proceeds to step ST5, whereat the writing of data is performed so as to raise the command flag on the command table within the memory 46 (see FIG. 1). If on the other hand a YES is output at decision step ST3, then the processing proceeds to the next decision step ST4, whereat it is determined whether or not the priority (priority right) exists. If the priority bit in the priority data 42b' shown in FIG. 7 is "1", then the priority right exists and therefore the processing proceeds to step ST5, whereat the writing of data is performed on the command table. If it is determined in the decisions step ST4 that the priority bit within the priority data 42b, is "0", or if a NO is output at step ST4, then the processing proceeds to step ST6. In step ST6, a busy signal is generated and transmitted to a particular sub-room of the sub-rooms 20 to 22, and the processing returns to step ST1. After the writing of data on the command table is finished at step ST5, then the processing proceeds to step ST7, whereat the command is executed, and corresponding audio and video informations are transmitted to the particular sub-room. In the next step ST8, N is selected to be "1", and it is determined in the next decision step ST9 whether or not an inequality of $N > 15$ is satisfied. If a NO is output at decision step ST9, then the processing proceeds to step ST1, whereat (N+1)'th command is read in, and similar steps are repeated thereafter. If a YES is output at decision step ST9, then the processing returns to the Start, whereat N is set to "0".

In this embodiment, only the remote controller 14b of the remote controllers 14a to 14c shown in FIG. 1 is provided with the priority key 14d, and the audio information 15 and the video information 16 of other sub-rooms 20 and 22 having priority rights (interests) can be controlled with priority by operating this priority key 14d.

Further, in this embodiment, the supply of power to the CD player 4, the tape cassette deck 5, the DAT deck 6, the AM/FM tuner 7, the VTR 8, the laser disc player 9 and the main amplifier 10 connected to the multi-link center 3 is effected by a power supply source circuit 72 provided within the multi-link center 3 as shown in FIG. 1. That is, the commercially available voltage supplied to the multi-link center 3 is supplied through opening and closing means such as a relay or the like provided within the power supply source circuit 72 to various kinds of electronic apparatus 4 to 10. The supply of power to the electronic apparatus 4 to 10 from the power supply source circuit 72 is controlled by the CPU 47, and this control is performed on the basis of the owner flag 41f (see FIG. 2A) involved in the first remote control signal 41.

Figure 10:
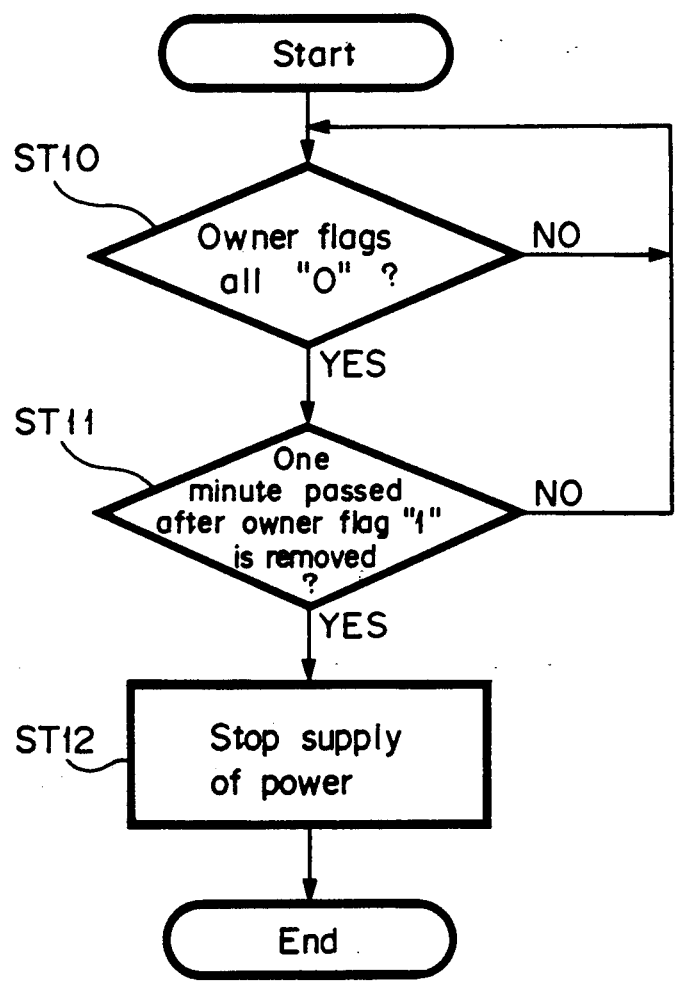
FIG. 10 is a flowchart to which references will be made in explaining operation of the embodiment of the signal transmission system according to the present invention when a power switch is turned off.

More specifically, as shown in a flowchart forming FIG. 10, following the Start of operation, it is determined in the next decision step ST10 whether or not owner flags are all "0". If the owner flags are not all "0" (i.e., any electronic apparatus is utilized and owner flag "1" is raised), then the opening and closing means within the power supply source circuit 72 is placed in the connected state and the power is supplied to various kinds of electronic apparatus 4 to 10. If the owner flags are all "0" as represented by a YES at decision step ST10, then it is determined that any one of the electronic apparatus 4 to 10 is not utilized, and the processing proceeds to the next decisions step ST11. It is determined in decision step ST11 whether or not one minute is passed in this condition (i.e., it is determined whether or not one minute is passed after the owner flag "1" is removed). If a YES is output at decision step ST11, then the processing proceeds to step ST12, whereat the opening and closing means within the power supply source circuit 72 is disconnected and the supply of power is stopped. If a NO is output at decision step ST11, then the processing returns to step ST10 and the above-mentioned steps are repeated.

Further, if the owner flag "1" is produced, the opening and closing means within the power supply source circuit 72 is immediately placed in the connected state and the power is supplied to various kinds of electronic apparatus 4 to 10.

Thus, in the above-mentioned arrangement, power can be prevented from being uselessly, and the safety of the signal transmission system can be assured. Further, the power switch is turned off after one minute is passed under the condition that no electronic apparatus are utilized so that, when the electronic apparatus is not utilized temporarily, the power switch can be prevented from being turned off, thus avoiding a trouble caused by frequently repeatedly turning on and off the power switch.

While the power sources of various kinds of electronic apparatus 4 to 10 connected to the multi-link center 3 are controlled at the same time as described above, a bit whose owner flag is "1" is detected and only the power source of the electronic apparatus corresponding to the owner flag "1" may be turned on. In this case, however, the opening and closing means for turning on/off the power sources must be provided in association with the number of electronic apparatus connected to the multi-link center 3. While the owner flag 41f involved in the first remote control signal 41 is detected to control the power supply source as described above, such a variant is also possible that the present status of various electronic apparatus is detected from other informations to thereby control the power supply source.

Figure 11:
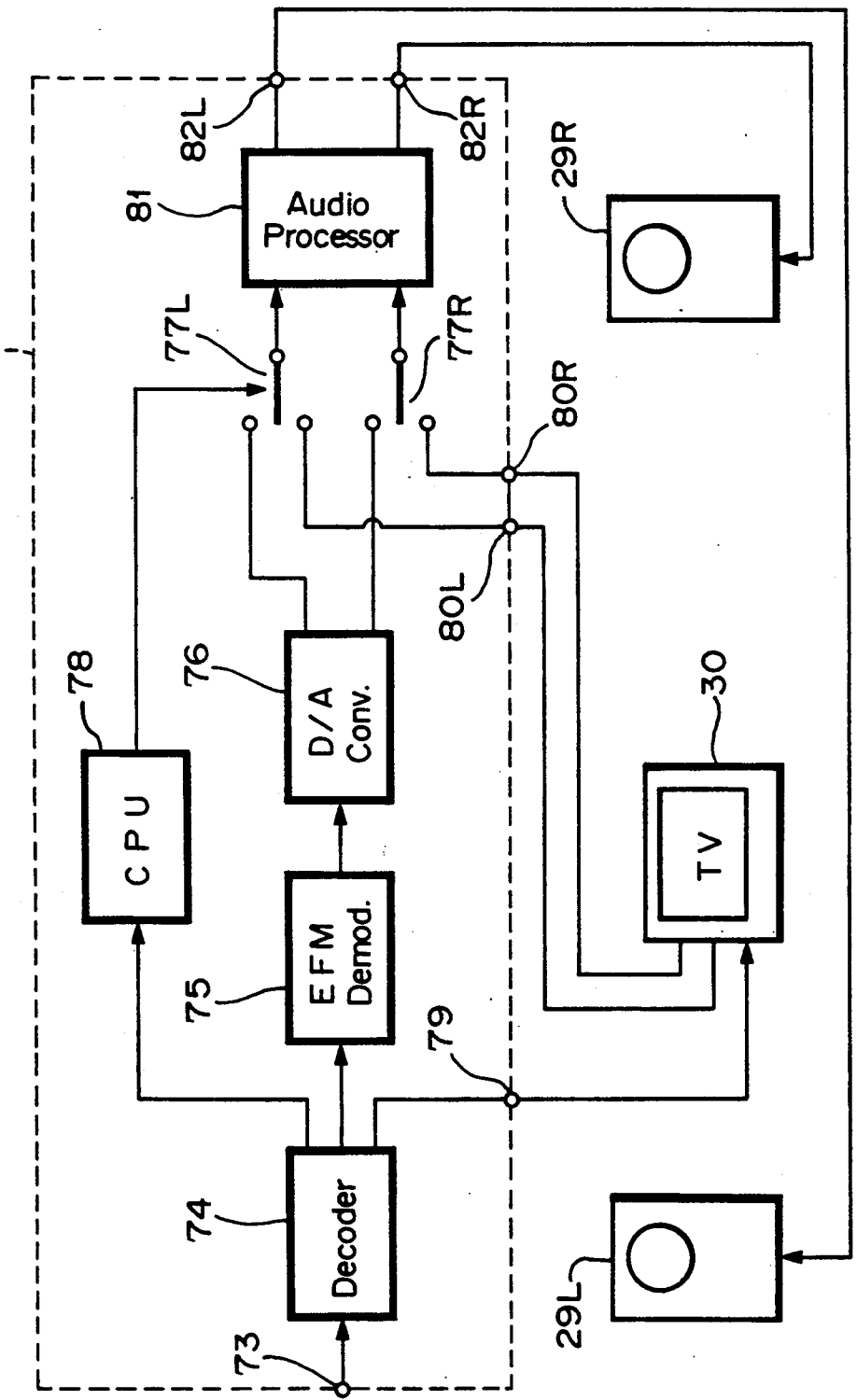
FIG. 11 is a schematic block diagram showing an arrangement of a sub-room according to the embodiment of the present invention.

Reception conditions of the respective sub-rooms 20 to 21 will be described with reference to FIG. 11. In FIG. 11, like parts corresponding to those of FIG. 1 are marked with the same references and therefore need not be described in detail. In this case, the reception is performed within the sub-room 21 in which the multi-link receiver 26 is connected with the left and right speakers 29L, 29R and the television receiver 30.

Referring to FIG. 11, information of each channel transmitted from the multi-link center 3 through the cable 19 (see FIG. 1) is supplied to a decoder 74 from an input terminal 73 of the multi-link receiver 26. The decoder 74 decodes a necessary channel from the carrier and extracts information involved in the decoded channel. Information extracted from the audio information channels $CH_1$ to $CH_2$ is supplied to an EFM-demodulating circuit 75 which demodulates the EFM-modulated data. The resultant digital data is supplied to a D/A converting circuit 76, in which the digital data is converted into analog audio signals, and the left and right analog audio signals are supplied to one fixed contacts of change-over switches 77L and 77R.

The first remote control signal 41 demodulated by the decoder 74 is supplied to a CPU 78 and the CPU 78 controls respective circuits provided within the multi-link receiver 26 on the basis of the first remote control signal 41. In this case, the change-over switches 77L and 77R also are controlled by the CPU 78.

Further, the signal of the video information channel CH4 and the signal of the CATV channel passed through the decoder 74 are supplied to the TV receiver 30 from an output terminal 79. In this case, those signals are supplied to an antenna line input terminal of the TV receiver 30. Then, the signals of the video information channel CH4 and the CATV channel are received by the tuner incorporated within the TV receiver 30 and received pictures are thereby displayed on the picture screen of the TV receiver 30. The audio signal frequency-multiplexed on the channel received by the tuner of the TV receiver 30 is output from an audio monitor output terminal of the TV receiver 30 as a baseband audio signal. In principle, sound is not emanated from a speaker of this TV receiver 30.

The left and right audio signals output from the audio monitor output terminals are supplied through audio signal output terminals 80L, 80R of the multi-link receiver 26 to the other fixed contacts of the change-over switches 77L and 77R.

Then, the left and right audio signals developed at the movable contacts of the change-over switches 77L, 77R of this multi-link receiver 26 are supplied to an audio signal processing circuit 81. This audio signal processing circuit 81 performs processings similar to those of a pre-amplifier and a main amplifier or the like, and the thus processed left and right audio signals are supplied through output terminals 82L, 82R to the left and right speakers 29L, 29R.

In this embodiment, the change-over switches 77L and 77R are changed in position in response to the present status of the audio information channels $CH_1$ to $CH_3$ under the control of the CPU 78. That is, when the user in the sub-room 21 wants to receive audio informations transmitted to the audio information channels $CH_1$ to $CH_3$ from the audio apparatus (CD player 4, the tape cassette deck 5, the DAT deck 6 and the AM/FM tuner 7) connected to the multi-link center 3 of the master room 2, the change-over switches 77L and 77R are switched such that the output audio signal from the D/A converting circuit 76 is supplied through the change-over switches 77L and 77R to the audio signal processing circuit 81. Since the change-over switches 77L and 77R are changed in position as described above, the digital audio signal transmitted from the multi-link center 3 of the master room 2 is received by the multi-link receiver 26 and reproduced by the stereo audio speakers 29L and 29R based on the received digital audio signal.

Further, when the CATV channel is received, the audio signal from the audio monitor output terminal of the TV receiver 30, the change-over switches 77L and 77R are changed in position so that this audio signal is supplied through the change-over switches 77L and 77R to the audio signal processing circuit 81. Since the change-over circuits 77L and 77R are changed in position as described above, the audio signal associated with the received video image transmitted to the CATV channels in a frequency multiplex fashion are received by the tuner incorporated within the TV receiver 30 and the received audio signal is supplied to and reproduced by the left and right speakers 29L and 29R.

When a video information transmitted to the video information channel CH4 from the video apparatus (the VTR 8 and the laser disc player (LD) 9) connected to the multi-link center 3 of the master room 2 is received, the change-over switches 77L and 77R are changed in position in response to the present status of the audio information channels $CH_1$ to $CH_3$. That is, when the video information is transmitted from the multi-link center 3, if any of the audio information channels $CH_1$ to $CH_3$ is vacant, the audio information accompanying with the video information received is transmitted through any one of the audio information channels $CH_1$ to $CH_3$. In that case, in the multi-link receiver 26, the CPU 78 can identify the transmission channel by detecting the content information 41d (see FIG. 2A) of the channel involved in the first remote control signal 41. When the CPU 78 determines that the audio information accompanying with the received video signal is transmitted through any one of the audio information channels $CH_1$ to $CH_3$, then this transmission channel is decoded by the decoder 74 and the change-over switches 77L and 77R are changed in position such that the output audio signal from the D/A converting circuit 76 is supplied through the change-over switches 77L and 77R to the audio signal processing circuit 81. Since the change-over switches 77L and 77R are changed in position under the control of the CPU 78, the audio signal associated with the video image received by the TV receiver 30 is supplied to and reproduced by the left and right speakers 29L and 29R. At that time, since the audio signal is transmitted from the multi-link center 3 as digital data, the audio signal of high quality can be reproduced by the left and right speakers 29L and 29R.

When the video information is received, if all the audio information channels $CH_1$ to $CH_3$ are utilized to transmit audio informations transmitted from the audio apparatus 4 to 7 in response to the requests of other sub-rooms 20 to 22, the audio information accompanying with the video information cannot be transmitted by means of the audio information channels $CH_1$ to $CH_3$. In such case, the change-over switches 77L and 77R are changed in position such that the audio signal from the audio monitor output terminal of the TV receiver 30 is supplied through the change-over switches 77L and 77R to the audio signal processing circuit 81. Also in this case, the CPU 78 can determined on the basis of the detected content information 41d of the channel involved in the first remote control signal 41 that the audio information from the video apparatus cannot be transmitted via the audio information channels $CH_1$ to $CH_3$.

Since the change-over switches 77L and 77R are changed in position as described above, the audio signal associated with the received video image transmitted to the video information channel CH4 in a frequency multiplex fashion is received by the tuner housed in the TV receiver 30, and the thus received audio signal is supplied to and reproduced by the left and right speakers 29L and 29R. In that event, since the FM-modulated analog audio signal transmitted from the multi-link center 3 side is utilized, the quality of the reproduced audio signal is slightly deteriorated as compared with the case that the digital audio signal transmitted through the audio information channel is reproduced.

As described above, according to this embodiment, when the video signal transmitted from the multi-link center 3 is received by the respective sub-rooms 20 to 22, if any one of the audio information channels $CH_1$ to $CH_3$ is vacant, the audio signal of high quality associated with the reproduced video image is reproduced on the basis of the digital audio signal transmitted through any one of the audio information channels $CH_1$ to $CH_3$. If any of the audio information channels $CH_1$ to $CH_3$ is not vacant, the audio signal associated with the reproduced video image is reproduced on the basis of the audio signal associated with the received video image transmitted in the video information channel CH4 in a frequency multiplex fashion. In other words, the audio and video signals are reproduced only through the video information channel CH4 so that the transmission channels CH1 to CH4 can be effectively utilized.

Figure 12A:
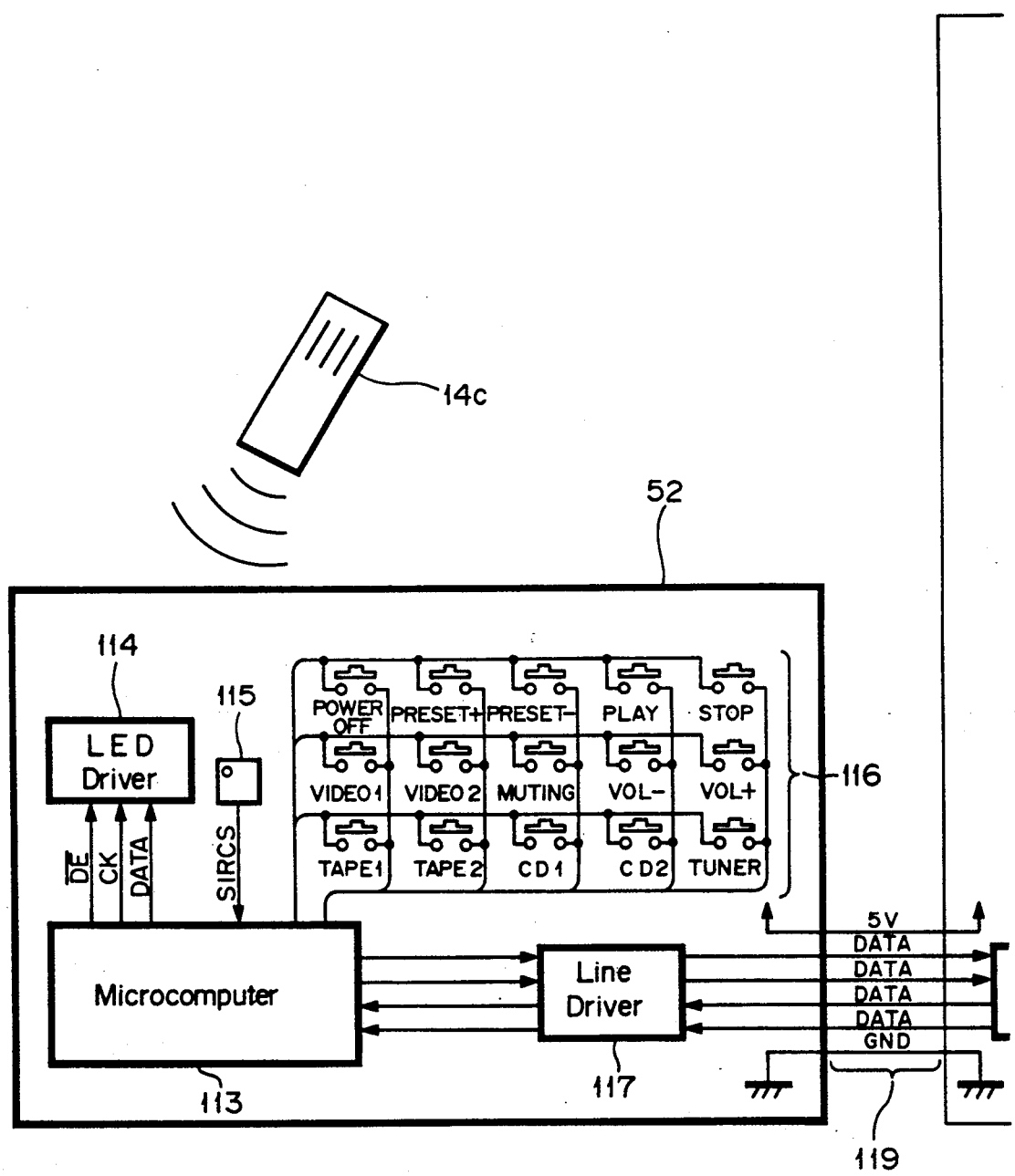
FIG. 12 (formed of FIGS. 12A and 12B) is a systematic block diagram showing an arrangement of a television receiver to which the present invention can be applied.
Figure 12B:
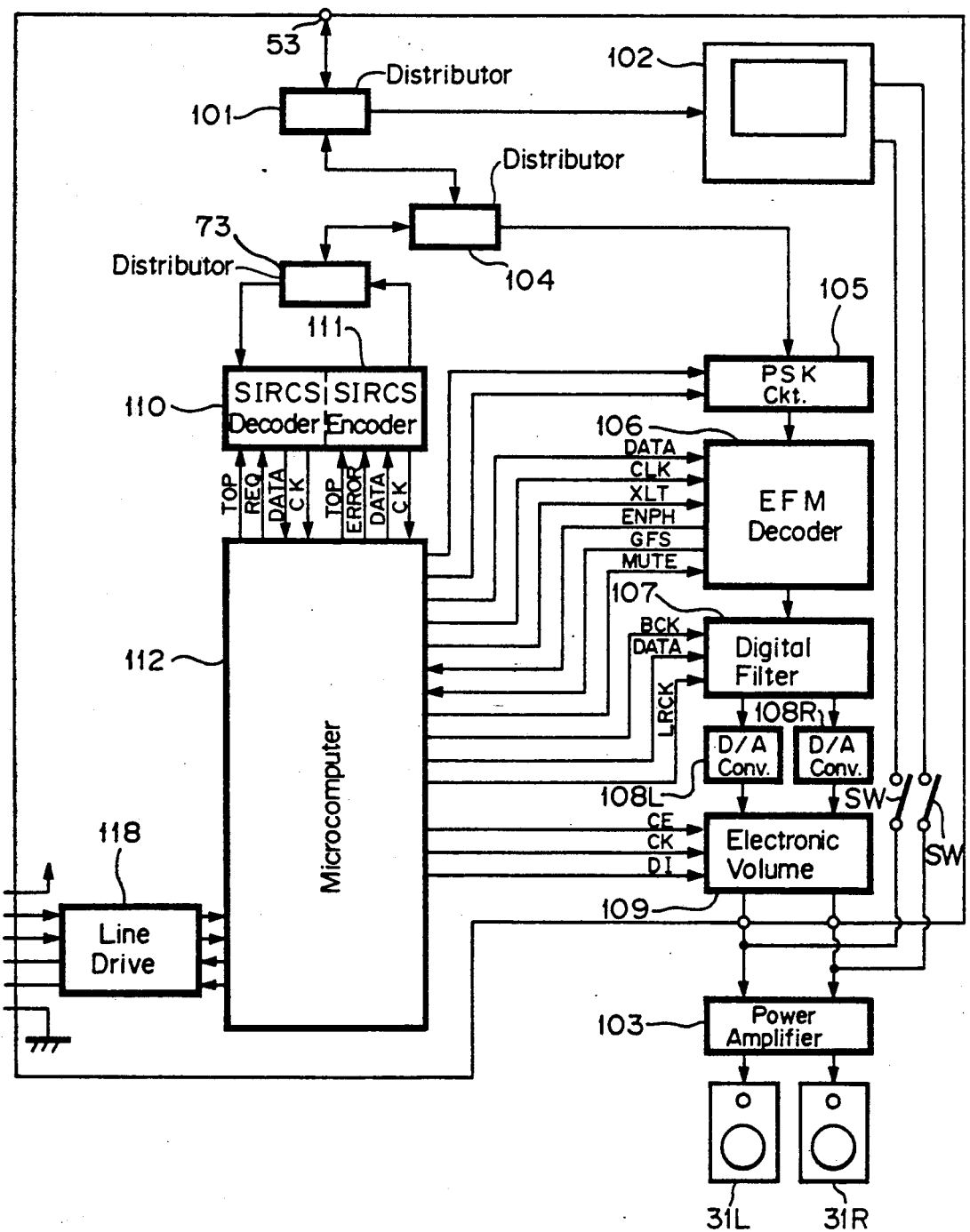

FIG. 12 shows in block circuit form the arrangement of the TV receiver 27 which incorporates therein the receiver as shown in FIG. 1. FIG. 12 is formed of FIGS. 12A and 12B drawn on two sheets of drawings so as to permit the use of a suitably large scale.

Referring to FIG. 12, an antenna terminal 53 is connected to the coaxial cable 19 (see FIG. 1), and CATV signal, broadcast TV signal or the video signal from the VTR 8 or the like supplied to the antenna terminal 53 are distributed by a distributor 101 and supplied to a TV receiving circuit 102 which is arranged similarly to the standard TV receiver, thereby a picture being displayed on a cathode ray tube (CRT) or the like. The audio signal is supplied through a switch SW and a power amplifier 103 to left and right speakers 31L and 31R, thereby being emanated from the left and right speakers 31L and 31R. The audio information 15 from the CD player 4 or the like within the master room 2 is demodulated through the coaxial cable 19, the antenna terminal 53, the distributor 101, a distributor 104, a PSK-demodulating circuit 105, an EFM decoder 106 and a digital filter 107 in that order. The PSK-demodulating circuit 105, the EFM decoder 106 and the digital filter 107 are controlled by various kinds of control signals as shown in FIG. 12. The audio information signal 15 processed by the digital filter 107 is converted into analog signals by D/A converting circuits 108L and 108R and supplied through an electronic volume 109 and the power amplifier 103 provided independently of the TV receiver 27 to the left and right speakers 31L and 31R, thereby being emanated. The first remote control signal 41 transmitted from the master room 2 side to the sub-rooms 20 to 22 and distributed by the distributor 104 and the second remote control signal 42 transmitted from the sub-rooms 20 to 22 to the master room 2 are decoded by a SIRCS decoder 110 and encoded by a SIRCS encoder 111 which is used to time-base-compress the signal. These decoder 110 and encoder 111 are controlled by the microcomputer 112, whereby the first and second remote control signals 41 and 42 are interchanged between the master room 2 and the sub-room 22. Each of operation units 50 to 52 formed of panels embedded into the walls of the sub-rooms 20 to 22 includes a microcomputer 113, an LED driving circuit 114 for indicating the volume of sound, a sensor 115 for receiving the SIRCS signal or the like and an operation key pad 116 for operating various apparatus such as CD, tape or the like within the master room 2. The operation unit 52, for example, is connected to the TV receiver 27 through line drivers 117 and 118 by an MIDI (Musical Instrument Digital Interface) cable 119.

According to the thus arranged system, since the SIRCS decoder 110, the SIRCS decoder and encoder 110 and 111 and the PCM (pulse code modulation) tuner (PSK, EFM decoders 105, 106) for the audio information 15 or the like are assembled as one body with the TV receiver 27, the multi-link receiver need not be separately provided within the sub-rooms but only the above-mentioned TV receiver 27 is provided within the sub-room 22, whereby the remote control signals and the audio and video informations can be interchanged between the sub-room 22 and the master room 2. Furthermore, it becomes possible to transmit a display signal for displaying the present status of various kinds of electronic apparatus of the master room 2 or the like on the CRT of the TV receiver 27.

In addition, it is needless to say that the present invention is not limited to the above MLS but can also be applied to a variety of home bus systems or the like which performs similar control operation.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A signal transmission system in which a plurality of electronic apparatus for respectively transmitting audio and/or video information are concentratedly installed in a single room, and said audio and/or video information from said plurality of said electronic apparatus are modulated by respective carrier frequencies in a frequency-multiplexed fashion and transmitted to a plurality of rooms via a single cable, comprising:

main control means, including means connected to said plurality of electronic apparatus and transmitting remote control signals to control said plurality of electronic apparatus, and means for modulating said audio and/or video information and said remote control signals in a frequency-multiplexed fashion and for allocating said audio and/or video information and said remote control information on respective channels, each having said carrier frequencies;

a plurality of receiving means, including means for selectively receiving one of said audio and/or video information from said electronic apparatus through said main control means, and input means for inputting a command to request to transmit said audio and/or video information from said electronic apparatus, and means for transmitting said remote control signals modulated by a predetermined carrier frequency to said main control means;

a cable means for transmitting said frequency-multiplexed, modulated audio and/or video signals and remote control signals between said main control means and said plurality of receiving means; and means for giving priority to at least one of said plurality of receiving means which first transmitted a remote control signal to said main control means at the first time to operate one of said electronic apparatuses, and counting means for counting which is started under a condition when another of said receiving means has stopped said operation, and erasing means for erasing said priority after said counting means counts a predetermined number of times.

2. A signal transmission system according to claim 1, wherein said main control means includes means for transmitting operation state information indicating operation conditions of each of said electronic apparatuses and priority information indicating said receiving means is given said priority to said receiving means, said receiving means being coupled to display means which display said operation state information and said priority information.

3. A signal transmission system according to claim 1, wherein said main control means includes means for generating a reference clock and for mixing said reference clock with said remote control signals and audio and/or video information to be synchronized with each of said receiving means.

4. A signal transmission system according to claim 3, wherein said main control means further includes a time/calendar generating circuit for generating time information and calendar information in accordance with said reference clock which is transmitted to said receiving means together with said audio and/or video information, and said receiving means is controlled on the basis of said time information and calendar information.

* * * * *